US012308010B2

(12) United States Patent
Wurtz et al.

(10) Patent No.: US 12,308,010 B2
(45) Date of Patent: May 20, 2025

(54) SYSTEMS, DEVICES AND METHODS RELATED TO DESIGN AND PRODUCTION OF ACTIVE NOISE CANCELLATION DEVICES

(71) Applicant: SKYWORKS SOLUTIONS, INC., Irvine, CA (US)

(72) Inventors: Michael Jon Wurtz, Lake Oswego, OR (US); Thomas Kuntz, Portland, OR (US); Evan Michael Albright, Portland, OR (US); Amit Kumar, Portland, OR (US)

(73) Assignee: Skyworks Solutions, Inc., Irvine, CA (US)

( * ) Notice: Subject to any disclaimer, the term of this patent is extended or adjusted under 35 U.S.C. 154(b) by 95 days.

(21) Appl. No.: 18/098,036

(22) Filed: Jan. 17, 2023

(65) Prior Publication Data

US 2023/0267908 A1 Aug. 24, 2023

Related U.S. Application Data

(60) Provisional application No. 63/300,222, filed on Jan. 17, 2022.

(51) Int. Cl.
*G10K 11/178* (2006.01)

(52) U.S. Cl.
CPC .. *G10K 11/17813* (2018.01); *G10K 11/17873* (2018.01)

(58) Field of Classification Search
CPC .................... G10K 11/17813; G10K 11/17873
USPC ........................................................ 381/71.1
See application file for complete search history.

(56) References Cited

U.S. PATENT DOCUMENTS 8,977,376 B1 * 3/2015 Lin ........................ G01H 11/06 381/326
2019/0037324 A1 * 1/2019 Darlington ............. H04R 29/00

* cited by examiner

*Primary Examiner* — Jason R Kurr
*Assistant Examiner* — Douglas J Suthers
(74) *Attorney, Agent, or Firm* — Chang & Hale LLP

(57) ABSTRACT

In some embodiments, a method for evaluating headphones during a manufacturing process can include generating a test sound and measuring a response to the test sound from a headphone being evaluated. The method can further include configuring and/or calibrating the headphone based on the measurement. In some embodiments, such a method can be implemented as part of a process for manufacturing of a large number of headphones having active noise cancellation functionality.

16 Claims, 4 Drawing Sheets

SYSTEMS, DEVICES AND METHODS RELATED TO DESIGN AND PRODUCTION OF ACTIVE NOISE CANCELLATION DEVICES

CROSS-REFERENCE TO RELATED APPLICATION(S)

This application claims priority to U.S. Provisional Application No. 63/300,222 filed Jan. 17, 2022, entitled SYSTEMS, DEVICES AND METHODS RELATED TO DESIGN AND PRODUCTION OF ACOUSTIC DEVICES, the disclosure of which is hereby expressly incorporated by reference herein in its respective entirety.

BACKGROUND

Field

The present disclosure relates to systems, devices and methods for design and production of active noise cancellation devices.

Description of the Related Art

In some applications, acoustic devices such as headphones can include active noise cancellation (ANC) functionality to remove or reduce unwanted noise for users. Such ANC headphones can be difficult to design and implement to provide good ANC performance.

SUMMARY

In accordance with some implementations, the present disclosure relates to a method for evaluating headphones during a manufacturing process. The method includes generating a test sound and measuring a response to the test sound from a headphone being evaluated. The method further includes configuring and/or calibrating the headphone based on the measurement.

In some embodiments, the method can further include measuring a response to the test sound from a test platform.

In some embodiments, the configuring and/or calibrating of the headphone can include configuring and/or calibrating an active noise cancellation component of the headphone. In some embodiments, the active noise cancellation component of the headphone can be included in an audio processing chip or module.

In some embodiments, the configuring and/or calibrating the active noise cancellation component can include configuring and/or calibrating coefficients of filters of the active noise cancellation component. In some embodiments, the generating of the test sound can include generating a sound representative of a noise to be actively canceled by the headphone.

In some embodiments, the test platform can include a head-and-torso simulator having a sensor.

In some embodiments, the measuring of the response from the headphone can include measurement of either or both of a sound received on an outside portion of the headphone and a sound received on an inside portion of the headphone. The sound received on the outside portion of the headphone can be utilized to evaluate a feed-forward active noise cancellation functionality of the headphone. The sound received on the inside portion of the headphone can be utilized to evaluate a feed-back active noise cancellation functionality of the headphone.

In some embodiments, the measuring of the response from the test platform can include measurement of a sound received at the platform to simulate a sound that would be received at ears of a user using the headphone.

In some implementations, the present disclosure relates to a method for manufacturing headphones. The method includes assembling N headphones and evaluating each of the N headphones. Each evaluating includes generating a test sound, measuring a response to the test sound from the respective headphone being evaluated, and configuring and/or calibrating the headphone based on the measurement. The method further includes analyzing the evaluation of the N headphones to identify a performance issue and/or a manufacturing defect.

In some embodiments, the evaluation of the N headphones can include a statistical analysis.

In some embodiments, the method can further include adjusting a manufacturing process based on the evaluation of the N headphones.

In some embodiments, the method can further include adjusting an acoustic design based on the evaluation of the N headphones.

In some embodiments, evaluating of each headphone can further include measuring a response to the test sound from a test platform.

In some implementations, the present disclosure relates to a system for evaluating a headphone. The system includes a sound generator configured to generate a test sound, and a computing device in communication with the sound generator and the headphone. The computing device is configured to measure a response to the test sound from the headphone being evaluated. The computing device is further configured to generate a control signal to configure and/or calibrate the headphone based on the measured response.

In some embodiments, the system can further include a test platform in communication with the computing device and configured to provide a response to the test sound. The control signal can be tailored to configure and/or calibrate an active noise cancellation component of the headphone. The control signal can be tailored to configure and/or calibrate coefficients of filters of the active noise cancellation component. The test sound can include a sound representative of a noise to be actively canceled by the headphone.

In some embodiments, the test platform can include, for example, a head-and-torso simulator having a sensor.

In some implementations, the present disclosure relates to a manufacturing system that includes an assembly system configured to assembly N headphones, and an evaluation system configured to evaluate each of the N headphones. The evaluation system includes a sound generator for generating a test sound, and a computing device configured to measure a response to the test sound from the respective headphone being evaluated. The computing device is further configured to set and/or calibrate the headphone based on the measurement. The manufacturing system further includes an analysis component configured to analyze the evaluation of the N headphones to identify a performance issue and/or a manufacturing defect.

In some embodiments, the analysis component can be part of the computing device or under the control of the computing device.

In some embodiments, the evaluation of the N headphones can include a statistical analysis.

In some embodiments, the analysis component can be further configured to provide information to allow adjustment of a manufacturing process based on the evaluation of the N headphones.

In some embodiments, the analysis component can be further configured to provide information to allow adjustment of an acoustic design based on the evaluation of the N headphones.

In some embodiments, the evaluation system can further include a test platform configured to provide a response to the test sound.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Many acoustic devices such as headphones include active noise cancellation (ANC) functionality to remove or reduce unwanted noise for users. It is noted that such an ANC headphone can be difficult to design and implement to provide good ANC performance.

In some ANC applications, an audio processing chip or module having ANC capability is fabricated or provided to a manufacturer of headphones. Such audio processing chips/modules are then installed and implemented into respective headphones during a manufacturing process. However, even if the audio processing chips/modules are capable of providing high performance ANC functionality, the foregoing manufacturing process may not provide headphone products and/or headphone configurations that fully benefits from the ANC performance capability of the audio processing chips/modules.

It is noted that ANC headphone design and/or production can be challenging due to a number of reasons. For example, in terms of acoustic design of a headphone, manufacturers may not know what kind of acoustic properties headphones should have to realize good ANC performance. Some examples of possible mismatch between design implementation can include microphone positions; type, gain and dynamic range of microphones; and acoustic leakage and coupling.

In another example, part-to-part variations during manufacturing of headphones may or may not remain within some ranges specified or desired in an ANC design such as ANC filter design. Some examples of such variations can include variation in acoustic response (e.g., in gain and/or frequency response) of different copies of microphones or speakers.

In view of the foregoing, some headphone manufacturers resort to a filter design and configuration that works across all variations of the parts; and such an approach often results in unimpressive ANC performance.

In another approach, some manufacturers rely on strict control of part-to-part variations, and/or trimming of gain of each microphone during an assembly process. Such an approach typically results in increased cost and/or reduced production throughput.

Disclosed herein are examples of systems, devices and methods that can address some or all of the foregoing challenges to thereby allow manufacturers to design and manufacture headphones having good ANC performance. For example, such headphones can provide ANC performance as allowed by the capability of an audio processing chip or module being utilized therein.

It will be understood that while various examples are described herein in the context of ANC functionality of headphones, one or more features of the present disclosure can also be utilized to improve design and/or manufacturing of headphones with respect to one or more other headphone functionalities.

Figure 1:
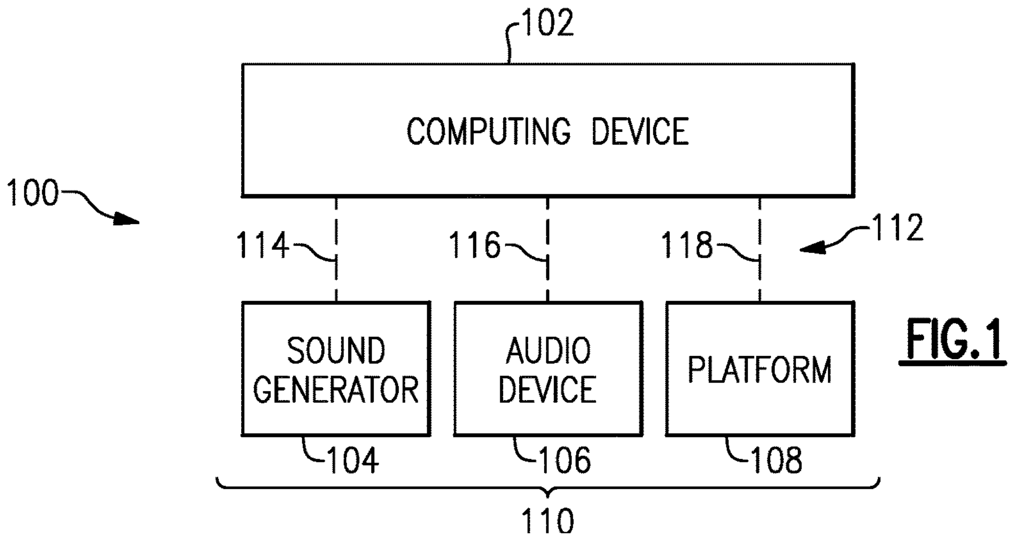
FIG. 1 depicts an audio device evaluation system that includes a computing device configured to communicate with an audio device being evaluated.

FIG. 1 depicts an audio device evaluation system 100 that includes a computing device 102 configured to communicate with an audio device 106 being evaluated. Such an audio device can be mounted on an evaluation platform 108 (e.g., a head-and-torso simulator (HATS)) which is also shown to be in communication with the computing device 102. In the example of FIG. 1, the computing device 102 is also shown to be in communication with a sound generator 104 to generate a desired sound for the evaluation of the audio device 106 mounted on the platform 108.

In the example of FIG. 1, communication between the computing device 102 and the audio device 106 is depicted as a dashed line 116; communication between the computing device 102 and the platform 108 is depicted as a dashed line 118; and communication between the computing device 102 and the sound generator 104 is depicted as a dashed line 114. It will be understood that each of such communication links 116, 118, 114 (collectively indicated as 112) can be implemented as a wired link, a wireless link, or some combination thereof. More specific examples of such communication links are described herein in greater detail.

Figure 2:
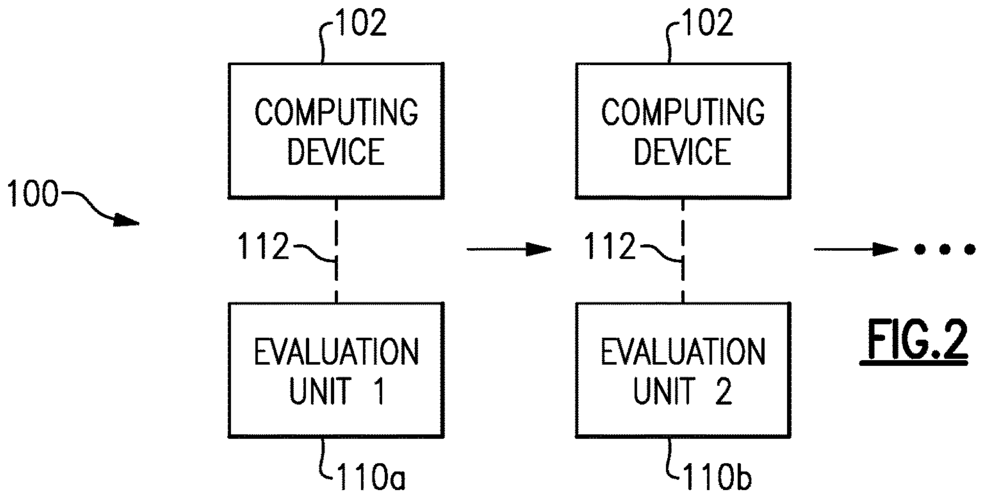
FIG. 2 shows that in some embodiments, the system of FIG. 1 can be configured to evaluate a plurality of audio devices in sequence.

In the example of FIG. 1, the audio device 106, the platform 108 and the sound generator 104 are collectively indicated as a unit 110. FIG. 2 shows that in some embodiments, the system 100 of FIG. 1 can be configured to evaluate a plurality of audio devices in sequence. In such an operating mode of the system 100, a given computing device 102 can evaluate a first audio device that is part of a first evaluation unit 110*a* through a communication link 112. Upon completion of evaluation of the first unit 110*a*, the computing device 102 can then evaluate a second audio device that is part of a second evaluation unit 110*b* through a communication link 112, etc.

Figure 3:
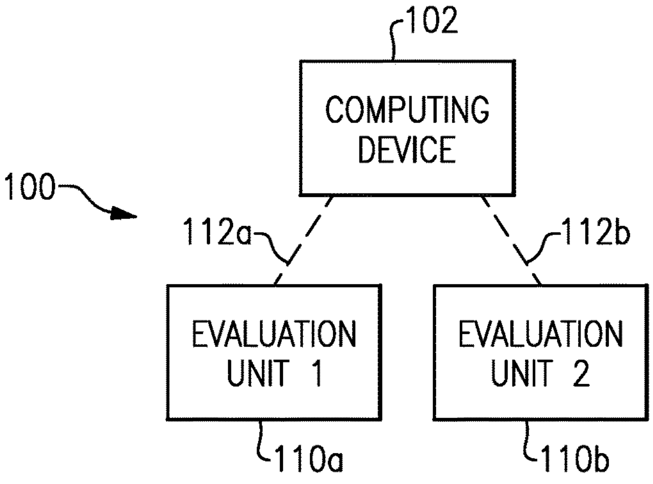
FIG. 3 shows that in some embodiments, the system of FIG. 1 can be configured to evaluate a plurality of audio devices in parallel.

FIG. 3 shows that in some embodiments, the system 100 of FIG. 1 can be configured to evaluate a plurality of audio devices in parallel. In such an operating mode of the system 100, a given computing device 102 can evaluate a first audio device that is part of a first evaluation unit 110*a* through a respective communication link 112*a*, and also evaluate a second audio device that is part of a second evaluation unit 110*b* through a respective communication link 112*b*. In such a mode of the system 100, the evaluation units 110*a*, 110*b* can utilize separate sound generators, or utilize a common sound generator.

Figure 4:
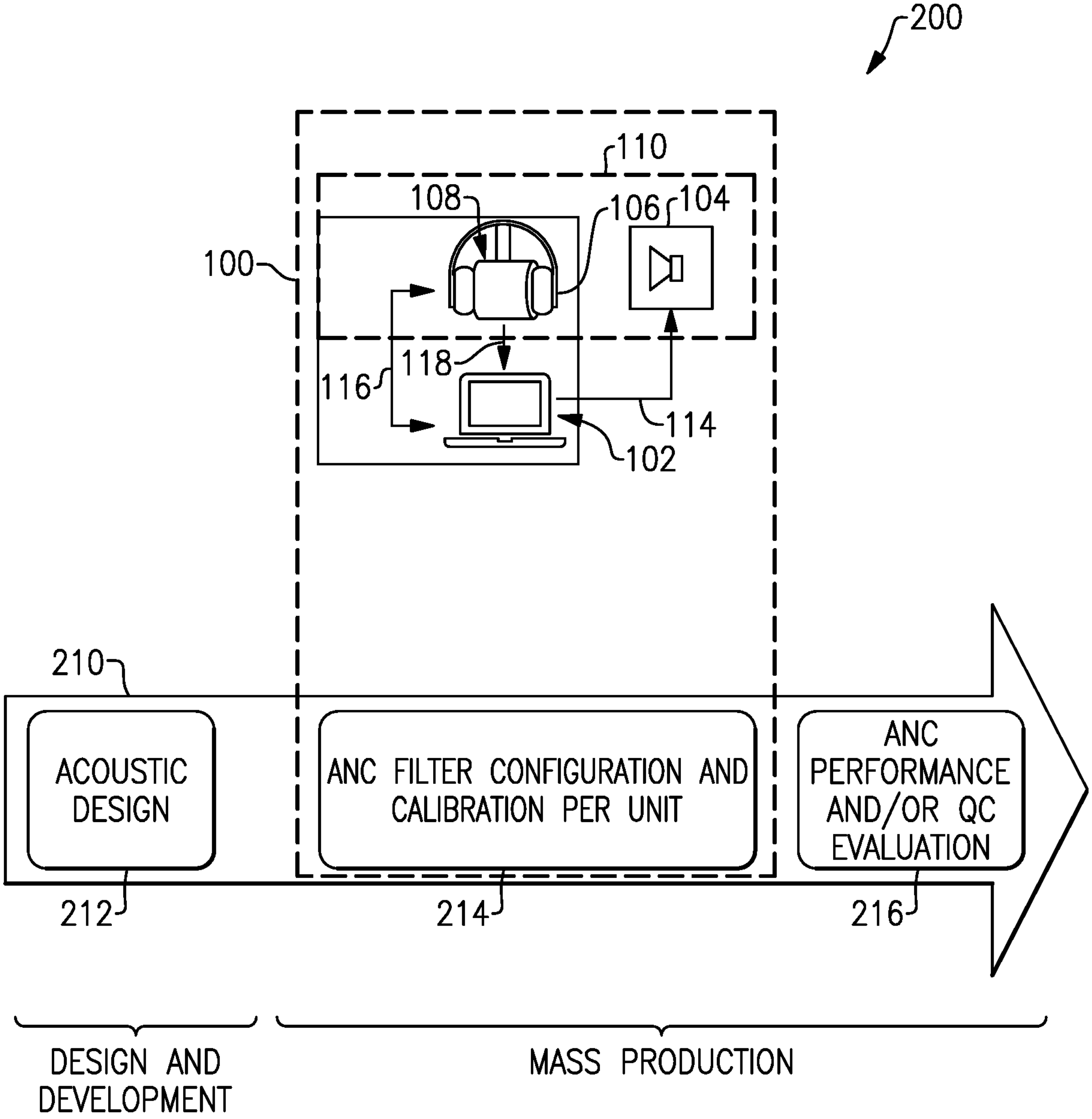
FIG. 4 shows that in some embodiments, the system of FIG. 1 can be implemented to include an evaluation of active noise cancellation (ANC) functionality of headphones.

FIG. 4 shows that in some embodiments, the system 100 of FIG. 1 can be implemented to include an evaluation of active noise cancellation (ANC) functionality of headphones. Thus, a system 100 shown in FIG. 4 includes a computing device 102 in communication with a headphone 106 mounted on an evaluation platform 108 (e.g., a head-and-torso simulator (HATS)) which is also in communication with the computing device 102. The computing device 102 is also shown to be in communication with a sound generator 104 to generate a desired sound for the evaluation of the headphone 106 mounted on the platform 108.

Configured in the foregoing manner, and as shown in FIG. 4, a communication link 114 between the computing device 102 and the sound generator 104 can be utilized to send a control signal from the computing device 102 to the sound generator 104, such that the sound generator 104 produces a sound for the evaluation of the headphone 106. Such a sound can include, for example, a sound representative of noise to be cancelled by the ANC system of the headphone 106.

Referring to FIG. 4, a communication link 118 between the computing device 102 and the platform 108 can be utilized to send a measurement signal from the platform 108 to the computing device 102. Such a measurement signal provided by the platform 108 can be representative of a sound received at the platform 108 to simulate a sound that would be received at the ears of a user using the headphone 106.

Referring to FIG. 4, a communication link 116 between the computing device 102 and the headphone 106 can be utilized to send a measurement signal from the headphone 106 to the computing device 102. Such a measurement signal from the headphone 106 can include a signal representative of a sound received on the outside of the headphone 106 (e.g., to evaluate an ANC system having a feed-forward ANC functionality), and/or a signal representative of a sound received on the inside of the headphone 106 (e.g., to evaluate an ANC system having a feed-back ANC functionality).

Referring to FIG. 4, the communication link 116 between the computing device 102 and the headphone 106 can also be utilized to send a control signal from the computing device 102 to the headphone 106. Such a control signal provided by the computing device 102 can be based on an analysis of the measurement signals from either or both of the platform 108 and the headphone 106, and allow setting and/or calibration of the ANC circuitry in the headphone 106. By way of an example, coefficients for ANC filters can be set and/or calibrated based on the control signal.

FIG. 4 also shows that in some embodiments, the headphone evaluation system 100 can be in a design and manufacturing system 200 to improve the performance and quality of headphones resulting therefrom. In FIG. 4, such a design and manufacturing system is shown to include a process flow (depicted as an arrow 210) that includes an acoustic design component 212 that can be part of a design and development portion.

In FIG. 4, the design and manufacturing system 200 is also shown to include a mass production portion configured to manufacture headphones based on a design provided by the acoustic design component 212. In some embodiments, such a mass production portion can include a process 214 implemented to configure and/or calibrate ANC filter(s) associated with each headphone during a respective unit evaluation process. In some embodiments, the headphone evaluation system 100 can be utilized at least during such a unit evaluation process.

In FIG. 4, the mass production portion can also include a process 216 to evaluate ANC performance and/or quality control (QC) of the design and manufacturing system 200, based on a number of unit evaluation processes. In some embodiments, such an evaluation provided by the process 216 can include, for example, statistical analyses associated with ANC performance and/or QC of the design and manufacturing system 200.

In some embodiments, the foregoing evaluation provided by the process 216 can be achieved by the headphone evaluation system 100, by another system based on information provided by headphone evaluation system 100, or some combination thereof.

In some embodiments, information provided by the foregoing evaluation (e.g., information resulting from the statistical analyses) can be provided to the acoustic design component 212 to allow, for example, modification of the design. In some embodiments, information provided by the foregoing evaluation (e.g., information resulting from the statistical analyses) can be provided to the mass production portion of the design and manufacturing system 200 to allow, for example, improved manufacturing in terms of ANC performance and/or QC of mass-produced headphones.

Figure 5:
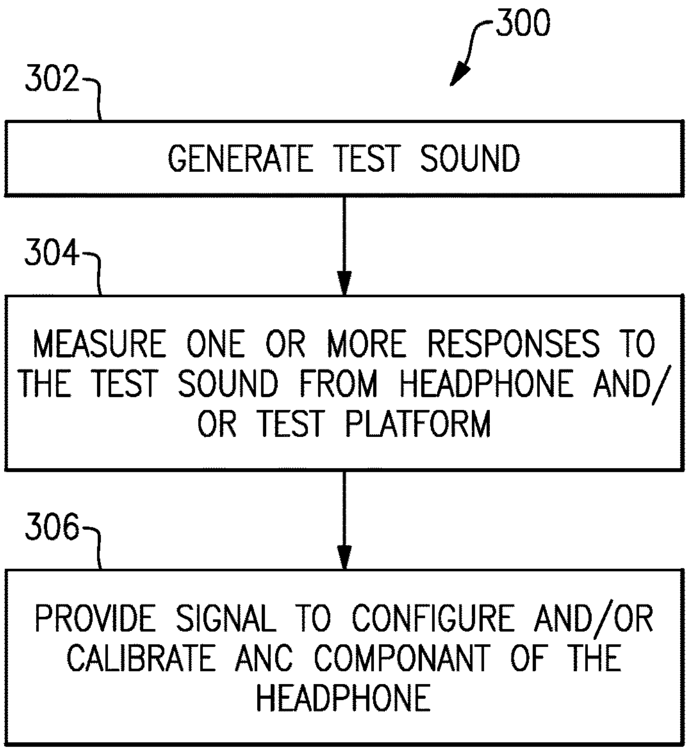
FIG. 5 shows a process that can be implemented to provide the evaluation functionality of FIG. 4.

FIG. 5 shows a process 300 that can be implemented by the evaluation system 100 of FIG. 4. In process block 302, a test sound can be generated. In process block 304, one or more responses to the test sound can be measured from a headphone and a corresponding test platform. In process block 306, a signal can be provided to configure and/or calibrate an ANC component of the headphone.

Figure 6:
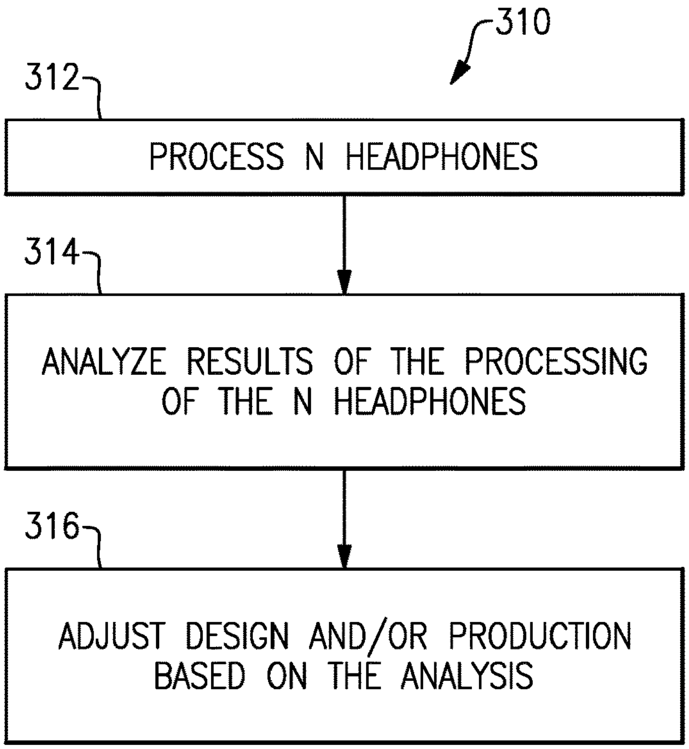
FIG. 6 shows a process that can be implemented by the system of FIG. 4.

FIG. 6 shows a process 310 that can be implemented by the design and manufacturing system 200 of FIG. 4. In process block 312, N headphones can be processed, with each being processed according to the process 300 of FIG. 5. In process block 314, results of the processing of the N headphones can be analyzed. In process block 316, design and/or production can be adjusted based on the analysis. In some embodiments, the quantity N can be selected to provide statistically significant results including results of one or more statistical analyses.

In some embodiments, one or more features of the present disclosure can provide an acoustic design guidance and validation test suite to provide, for example, guidelines to design headphones with ANC-friendly acoustic properties, and a suite of tests to allow manufacturers verify the designed acoustic properties.

In some embodiments, one or more features of the present disclosure can be implemented in a system for improving ANC filter design and/or calibration functionalities. As described herein, such functionalities can be supported by a physical structure to allow mounting of headphone(s) being evaluated, an external speaker to generate, for example, ambient sound, and a computing device executing one or more algorithms and in communication with the headphone(s), the mounting structure, and the external speaker. Accordingly, one or more features of the present disclosure can allow an ANC chip/module produced by one manufacturer to be effectively implemented in a headphone being produced by another manufacturer by utilizing the foregoing system.

In some embodiments, one or more features of the present disclosure can be implemented to detect and provide diagnostics of defects in either or both of design and manufacturing portions associated with headphones. As described herein, such defects can be identified by evaluation of ANC performance, and information thus obtained can be utilized to correct defects, improve ANC performance, etc.

Figure 7:
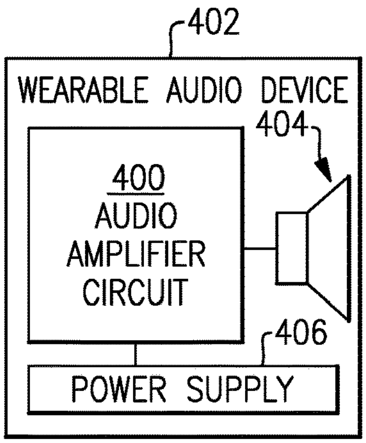
FIG. 7 depicts an audio device that can be produced and configured utilizing one or more features of the present disclosure.

FIG. 7 depicts an audio device that can be produced and configured utilizing one or more features as described herein. In some embodiments, such an audio device can be implemented as a wearable audio device 402 capable of communicating with a host device. Such communication can be supported by, for example, a wireless link such as a short-range wireless link in accordance with a common industry standard, a standard specific for the system, or some combination thereof. In some embodiments, the wireless link can include digital format of information being transferred from one device to the other (e.g., from the host device to the wearable audio device 402).

In FIG. 7, the wearable device 402 is shown to include an audio amplifier circuit 400 that provides an electrical audio signal to a speaker 404 based on a digital signal received from the host device. Such an electrical audio signal can drive the speaker 404 and generate sound representative of a content provided in the digital signal, for a user wearing the wearable device 402.

In some embodiments, the wearable device 402 can include an active noise cancellation (ANC) functionality, and such a functionality can be configured utilizing one or more features as described herein.

In FIG. 7, the wearable device 402 can be a wireless device; and thus typically includes its own power supply 406 including a battery. Such a power supply can be configured to provide electrical power for the audio device 402, including power for operation of the audio amplifier circuit 400.

Figure 8:
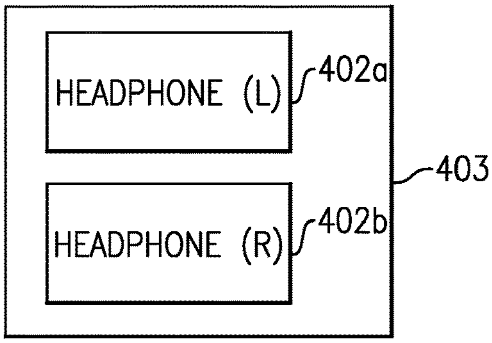
FIG. 8 shows an audio device that can be a more specific example of the audio device of FIG. 7.

FIG. 8 shows that in some embodiments, the wearable audio device 402 of FIG. 7 can be implemented as part of a headphone 403 configured to be worn on the head of a user, such that the audio device (402*a* or 402*b*) is positioned on or over a corresponding ear of the user. In the example of FIG. 8, a pair of audio devices (402*a* and 402*b*) can be provided-one for each of the two ears of the user. In some embodiments, each audio device (402*a* or 402*b*) can include its own components (e.g., audio amplifier circuit, speaker and power supply) described above in reference to FIG. 7. In some embodiments, one audio device (402*a* or 402*b*) can include an audio amplifier circuit that provides outputs for the speakers of both audio devices. In some embodiments, the pair of audio devices 402*a*, 402*b* of the headphone 403 can be operated to provide, for example, stereo functionality for left (L) and right (R) ears.

Figure 9:
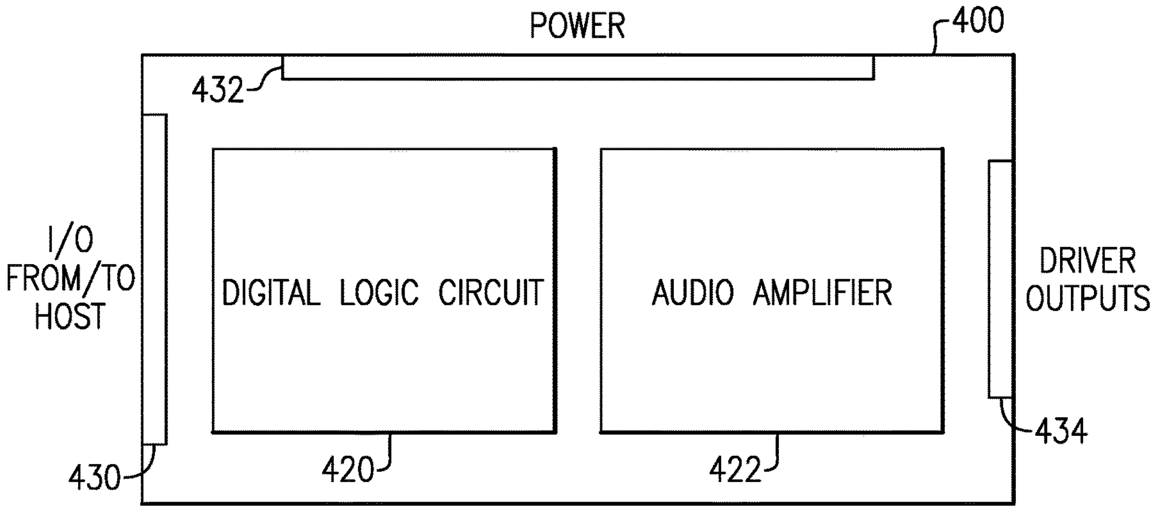
FIG. 9 shows an example of an audio amplifier circuit that can be configured utilizing one or more features as described herein.

FIG. 9 shows that in some embodiments, the audio amplifier circuit 400 of FIG. 7 can include a number of functional blocks. More particularly, in FIG. 9, an audio amplifier circuit 400 is shown to include a digital logic circuit block 420 and an amplifier block 422. In some embodiments, one or more features associated with active noise cancellation (ANC) as described herein can be implemented in the digital logic circuit block 420.

In FIG. 9, the audio amplifier circuit 400 is shown to further include various interfaces to allow the audio amplifier circuit 400 to interact with other devices external to the audio amplifier circuit 400. For example, an interface indicated as 430 can be configured to support input/output (I/O) functionality with respect to a host device. An interface indicated as 434 can be configured to support providing of electrical audio signals to a speaker (e.g., 404 in FIG. 7). An interface indicated as 432 can be configured to support providing of electrical power to various parts of the audio amplifier circuit 400.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for evaluating headphones during a manufacturing process, the method comprising:

generating a test sound;

measuring a response to the test sound from a headphone being evaluated to include a sound received on an outside portion of the headphone;

measuring a response to the test sound from a test platform; and configuring and/or calibrating the headphone based on the measurements from the headphone and the test platform, the sound received on the outside portion of the headphone being utilized to evaluate a feed-forward active noise cancellation functionality of the headphone.

2. The method of claim 1 wherein the configuring and/or calibrating of the headphone includes configuring and/or calibrating an active noise cancellation component of the headphone.

3. The method of claim 2 wherein the active noise cancellation component of the headphone is included in an audio processing chip or module.

4. The method of claim 2 wherein the configuring and/or calibrating the active noise cancellation component includes configuring and/or calibrating coefficients of filters of the active noise cancellation component.

5. The method of claim 2 wherein the generating of the test sound includes generating a sound representative of a noise to be actively canceled by the headphone.

6. The method of claim 1 wherein the test platform includes a head-and-torso simulator having a sensor.

7. The method of claim 1 wherein the measuring of the response from the headphone further includes measurement of a sound received on an inside portion of the headphone.

8. The method of claim 7 wherein the sound received on the inside portion of the headphone is utilized to evaluate a feed-back active noise cancellation functionality of the headphone.

9. The method of claim 1 wherein the measuring of the response from the test platform includes measurement of a sound received at the platform to simulate a sound that would be received at ears of a user using the headphone.

10. A method for manufacturing headphones, the method comprising:

assembling N headphones, quantity N being an integer greater than one;

evaluating each of the N headphones, each evaluating including generating a test sound, measuring a response to the test sound from the respective headphone being evaluated to include a sound received on an outside portion of the headphone, the evaluating further including measuring a response to the test sound from a test platform, and configuring and/or calibrating the headphone based on the measurements from the headphone and the test platform, the sound received on the outside portion of the headphone being utilized to evaluate a feed-forward active noise cancellation functionality of the headphone; and analyzing the evaluation of the N headphones to identify a performance issue and/or a manufacturing defect.

11. The method of claim 10 wherein the evaluation of the N headphones includes a statistical analysis.

12. The method of claim 10 further comprising adjusting a manufacturing process based on the evaluation of the N headphones.

13. The method of claim 10 further comprising adjusting an acoustic design based on the evaluation of the N headphones.

14. A system for evaluating a headphone, comprising:

a sound generator configured to generate a test sound;

a test platform for mounting of the headphone; and a computing device configured to measure a response to the test sound from the headphone being evaluated to include a sound received on an outside portion of the headphone, and to measure a response to the test sound from the test platform, the computing device further configured to generate a control signal to configure and/or calibrate the headphone based on the measured responses from the headphone and the test platform, the sound received on the outside portion of the headphone being utilized to evaluate a feed-forward active noise cancellation functionality of the headphone.

15. The system of claim 14 wherein the control signal is tailored to configure and/or calibrate an active noise cancellation component of the headphone.

16. The system of claim 14 wherein the test platform includes a head-and-torso simulator having a sensor.

* * * * *